United States Patent
Suzuki

(10) Patent No.: US 10,737,969 B2
(45) Date of Patent: *Aug. 11, 2020

(54) GLASS MATERIAL AND METHOD FOR MANUFACTURING SAME

(71) Applicant: NIPPON ELECTRIC GLASS CO., LTD., Otsu-shi, Shiga (JP)

(72) Inventor: Futoshi Suzuki, Otsu (JP)

(73) Assignee: Nippon Electric Glass Co., Ltd., Shiga (JP)

( * ) Notice: Subject to any disclaimer, the term of this patent is extended or adjusted under 35 U.S.C. 154(b) by 201 days.

This patent is subject to a terminal disclaimer.

(21) Appl. No.: 15/571,087

(22) PCT Filed: Sep. 2, 2016

(86) PCT No.: PCT/JP2016/075827
§ 371 (c)(1),
(2) Date: Nov. 1, 2017

(87) PCT Pub. No.: WO2017/051685
PCT Pub. Date: Mar. 30, 2017

(65) Prior Publication Data
US 2018/0186683 A1    Jul. 5, 2018

(30) Foreign Application Priority Data

Sep. 24, 2015  (JP) ................................. 2015-186268

(51) Int. Cl.
| | | |
|---|---|---|
| *C03C 3/068* | (2006.01) | |
| *G02B 1/00* | (2006.01) | |
| *C03C 4/00* | (2006.01) | |
| *C03B 19/10* | (2006.01) | |
| *C03B 19/06* | (2006.01) | |
| *C03C 4/10* | (2006.01) | |
| *C03B 40/04* | (2006.01) | |
| *C03B 5/16* | (2006.01) | |
| *C03B 32/00* | (2006.01) | |
| *G02F 1/00* | (2006.01) | |

(52) U.S. Cl.
CPC ................ *C03C 3/068* (2013.01); *C03B 5/16* (2013.01); *C03B 19/063* (2013.01); *C03B 19/1005* (2013.01); *C03B 32/00* (2013.01); *C03B 40/04* (2013.01); *C03C 4/0085* (2013.01); *C03C 4/10* (2013.01); *G02B 1/00* (2013.01); *G02F 1/0036* (2013.01)

(58) Field of Classification Search
CPC .......... C03C 3/068; C03C 3/095; C03C 3/15; C03C 3/12; G02F 1/0036; C03B 5/15; C03B 32/00; C03B 40/04; C03B 2201/60; C03B 2201/62

See application file for complete search history.

(56) References Cited

U.S. PATENT DOCUMENTS

| 3,971,723 A * | 7/1976 | Tajima ..................... C03C 3/064 252/62.51 R |
|---|---|---|
| 10,093,574 B2 * | 10/2018 | Suzuki ..................... C03C 3/068 |
| 2012/0126172 A1 * | 5/2012 | Zhou ........................ C03C 3/068 252/301.4 F |
| 2015/0344349 A1 * | 12/2015 | Sato ......................... C03B 40/04 65/84 |
| 2017/0226002 A1 | 8/2017 | Suzuki |

FOREIGN PATENT DOCUMENTS

| CN | 103708726 A | 4/2014 |
|---|---|---|
| CN | 104583139 A | 4/2015 |
| JP | 51-046524 B | 12/1976 |
| JP | 52-032881 B | 8/1977 |
| JP | 55-042942 B | 11/1980 |
| JP | 10-297933 * | 11/1998 |
| JP | 10-297933 A | 11/1998 |
| JP | 2007-308348 A | 11/2007 |
| JP | 2015-129058 A | 7/2015 |
| JP | 2016-155740 A | 9/2016 |
| WO | WO 2014/103662 * | 7/2013 |
| WO | 2014/103662 A1 | 7/2014 |
| WO | 2016/121655 A1 | 8/2016 |

OTHER PUBLICATIONS

Official Communication issued in International Patent Application No. PCT/JP2016/075827, dated Oct. 11, 2016.
Official Communication issued in Chinese Patent Application No. 201680055170.7, dated Feb. 3, 2020.

* cited by examiner

*Primary Examiner* — C Melissa Koslow
(74) *Attorney, Agent, or Firm* — Keating and Bennett, LLP

(57) ABSTRACT

Provided is a glass material that can satisfy both high Faraday effect and high light transmittance at wavelengths used. A glass material containing, in terms of % by mole of oxide, more than 40% $Tb_2O_3$ and having a percentage of $Tb^{3+}$ of 55% by mole or more relative to a total content of Tb.

4 Claims, 1 Drawing Sheet

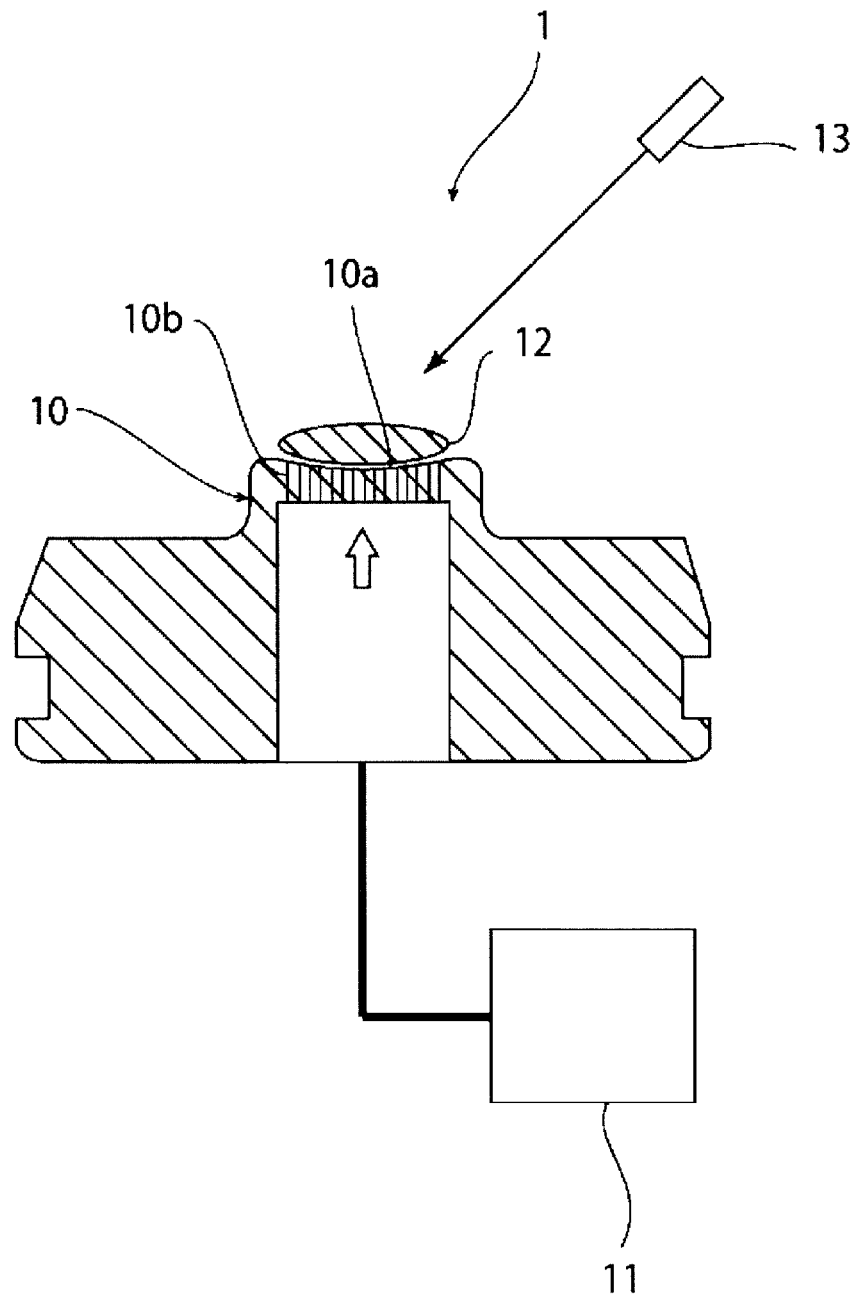

GLASS MATERIAL AND METHOD FOR MANUFACTURING SAME

TECHNICAL FIELD

The present invention relates to a glass material suitable for a magneto-optical element making up part of a magnetic device, such as an optical isolator, an optical circulator or a magnetic sensor, and a method for manufacturing the same.

BACKGROUND ART

A glass material containing terbium oxide which is a paramagnetic compound is known to exhibit the Faraday effect which is one of magneto-optical effects. The Faraday effect is an effect of rotating the polarization plane of linearly polarized light passing through a material placed in a magnetic field. This effect is utilized in magneto-optical devices, including optical isolators and magnetic field sensors.

The optical rotation θ (angle of rotation of the polarization plane) due to the Faraday effect is expressed by the following formula where the intensity of a magnetic field is represented by H and the length of a substance through which polarized light passes is represented by L. In the formula, V represents a constant dependent on the type of the substance and is referred to as a Verdet constant. The Verdet constant takes positive values for diamagnetic substances and takes negative values for paramagnetic substances. The larger the absolute value of the Verdet constant, the larger the absolute value of the optical rotation, resulting in exhibition of greater Faraday effect.

$$\theta = VHL$$

Conventionally known glass materials exhibiting the Faraday effect include $SiO_2$—$B_2O_3$—$Al_2O_3$—$Tb_2O_3$-based glass materials (see Patent Literature 1), $P_2O_5$—$B_2O_3$—$Tb_2O_3$-based glass materials (see Patent Literature 2), and $P_2O_5$—$TbF_3$—$RF_2$— (where R represents an alkaline earth metal) based glass materials (see Patent Literature 3).

CITATION LIST

Patent Literature

[PTL 1]
Examined Japanese Patent Application Publication No. S51-46524
[PTL 2]
Examined Japanese Patent Application Publication No. S52-32881
[PTL 3]
Examined Japanese Patent Application Publication No. S55-42942

SUMMARY OF INVENTION

Technical Problem

Although the above glass materials exhibit some degree of Faraday effect, recent increasing size reduction of magnetic devices requires further improvement of the Faraday effect so that even a small member can exhibit a sufficient optical rotation. In order to increase the Faraday effect, it is effective to increase the content of Tb in the glass material. However, in this case, the light transmittance at wavelengths (for example, 300 to 1100 nm) used tends to decrease, which presents a problem that the resultant magneto-optical device has a poor light extraction efficiency.

In view of the foregoing, an object of the present invention is to provide a glass material that can satisfy both high Faraday effect and high light transmittance at wavelengths used.

Solution to Problem

A glass material according to the present invention contains, in terms of % by mole of oxide, more than 40% $Tb_2O_3$ and has a percentage of $Tb^{3+}$ of 55% by mole or more relative to a total content of Tb.

The glass material according to the present invention can achieve high Faraday effect by containing much $Tb_2O_3$ as described above. Meanwhile, in a magnetic material containing Tb, Tb is present mainly in states of $Tb^{3+}$ and $Tb^{4+}$. Here, $Tb^{3+}$ has relatively low light absorption within a range of wavelengths from 300 to 1100 nm, while $Tb^{4+}$ has broad light absorption within the range of wavelengths from 300 to 1100 nm, which causes a decrease in light transmittance. Since the glass material according to the present invention has a high percentage of $Tb^{3+}$ relative to the total content of Tb as described above, its light absorption within the range of wavelengths from 300 to 1100 nm due to $Tb^{4+}$ is low and the glass material is therefore excellent in light transmittance.

The glass material according to the present invention preferably has a light transmittance of 60% or more at a wavelength of 633 nm and an optical path length of 1 mm.

The glass material according to the present invention preferably further contains, in % by mole, 0 to 50% $SiO_2$, 0 to 50% $B_2O_3$, and 0 to 50% $Al_2O_3$.

The glass material according to the present invention is preferably used as a magneto-optical element.

The glass material according to the present invention can be used as a magneto-optical element. For example, the glass material according to the present invention can be used as a Faraday rotator which is a type of magneto-optical element. The use of the glass material for the above application makes it easy for the glass material to be given the effect of the present invention.

A method for manufacturing a glass material according to the present invention is a method for manufacturing a glass material containing Tb and includes the steps of: melting a glass raw material and solidifying a resultant molten glass by cooling to obtain a precursor glass; and thermally treating the precursor glass in an inert atmosphere or a reducing atmosphere.

As described previously, in a magnetic material containing Tb, $Tb^{4+}$ has broad light absorption within the range of wavelengths from 300 to 1100 nm, which causes a decrease in light transmittance. To cope with this, after the precursor glass containing Tb is produced, the precursor glass is thermally treated in an inert atmosphere or a reducing atmosphere. Thus, Tb can be reduced or the oxidation of Tb can be inhibited. As a result, the percentage of $Tb^{3+}$ relative to the total content of Tb in the glass material can be increased to increase the light transmittance at wavelengths of 300 to 1100 nm.

In the method for manufacturing a glass material according to the present invention, the precursor glass is preferably thermally treated at a temperature of (a glass transition point −50° C.) to (the glass transition point +100° C.). By doing so, the percentage of $Tb^{3+}$ relative to the total content of Tb in the precursor glass can be efficiently increased.

In the method for manufacturing a glass material according to the present invention, the molten glass is preferably obtained by heating a block of glass raw material to melting with the block of glass raw material held levitated above a forming surface of a forming die by jetting gas through a gas jet hole opening on the forming surface.

Particularly in the case of a glass material containing much Tb, a usual melting method using a melting container is likely to cause devitrification originating at the interface between the melting container and the molten glass and therefore has difficulty vitrifying the glass raw material. By melting the block of glass raw material while holding it levitated by gas as described above, the block of glass raw material can be vitrified without devitrification.

In the method for manufacturing a glass material according to the present invention, the block of glass raw material is preferably levitated by an inert gas.

By doing so, the oxidation of Tb during melting of glass can be inhibited, so that the percentage of $Tb^{3+}$ relative to the total content of Tb can be increased.

In the method for manufacturing a glass material according to the present invention, the glass material preferably contains, in terms of % by mole of oxide, more than 40% $Tb_2O_3$.

Advantageous Effects of Invention

The present invention enables provision of a glass material that can satisfy both high Faraday effect and high light transmittance at wavelengths used.

BRIEF DESCRIPTION OF DRAWINGS

FIG. 1 is a schematic cross-sectional view showing one embodiment of an apparatus for manufacturing a precursor glass.

DESCRIPTION OF EMBODIMENTS

A glass material according to the present invention contains, in terms of % by mole of oxide, preferably more than 40% $Tb_2O_3$, more preferably 45% or more $Tb_2O_3$, still more preferably 48% or more $Tb_2O_3$, yet still more preferably 49% or more $Tb_2O_3$, and particularly preferably 50% or more $Tb_2O_3$. By increasing the content of $Tb_2O_3$ in this manner, a good Faraday effect (for example, an absolute value of a Verdet constant of 0.5 min/Oe·cm or more or even 0.6 min/Oe·cm or more at a wavelength of 633 nm) becomes likely to be achieved. Note that Tb in the glass is present in a trivalent state or a quadrivalent state, but all of these states of Tb are represented as $Tb_2O_3$ in the present invention.

In the glass material according to the present invention, the percentage of $Tb^{3+}$ relative to the total content of Tb is, in % by mole, preferably 55% or more, more preferably 60% or more, still more preferably 70% or more, yet still more preferably 80% or more, even still more preferably 90% or more, and particularly preferably 95% or more. If the percentage of $Tb^{3+}$ relative to the total content of Tb is too small, the light transmittance at wavelengths of 300 to 1100 nm is likely to decrease.

The glass material according to the present invention may contain, in addition to $Tb_2O_3$, the following components. In the following description of the contents of components, "%" refers to "% by mole" unless otherwise specified.

$SiO_2$ is a component for forming a glass network and widening the vitrification range. However, the component does not contribute to increase in the Verdet constant. Therefore, if its content is too large, a sufficient Faraday effect is less likely to be achieved. Hence, the content of $SiO_2$ is preferably 0 to 50% and particularly preferably 1 to 35%.

$B_2O_3$ is a component for forming a glass network and widening the vitrification range. However, $B_2O_3$ does not contribute to increase in the Verdet constant. Therefore, if its content is too large, a sufficient Faraday effect is less likely to be achieved. Hence, the content of $B_2O_3$ is preferably 0 to 50% and particularly preferably 1 to 40%.

$Al_2O_3$ is a component for increasing the glass formation ability. However, $Al_2O_3$ does not contribute to increase in the Verdet constant. Therefore, if its content is too large, a sufficient Faraday effect is less likely to be achieved. Hence, the content of $Al_2O_3$ is preferably 0 to 50% and particularly preferably 0 to 30%.

$La_2O_3$, $Gd_2O_3$, $Y_2O_3$, and $Yb_2O_3$ have the effect of making vitrification stable. However, an excessive large content thereof contrariwise makes the glass raw material less likely to be vitrified. Therefore, the content of each of $La_2O_3$, $Gd_2O_3$, $Y_2O_3$, and $Yb_2O_3$ is preferably 10% or less and particularly preferably 5% or less.

$Dy_2O_3$, $Eu_2O_3$, and $Ce_2O_3$ make vitrification stable and contribute to increase in the Verdet constant. However, an excessive large content thereof contrariwise makes the glass raw material less likely to be vitrified. Therefore, the content of each of $Dy_2O_3$, $Eu_2O_3$, and $Ce_2O_3$ is preferably 15% or less and particularly preferably 10% or less. Note that Dy, Eu, and Ce in the glass are present in a trivalent state or a quadrivalent state, but all of these states are represented as $Dy_2O_3$, $Eu_2O_3$ or $Ce_2O_3$ in the present invention.

MgO, CaO, SrO, and BaO have the effect of making vitrification stable and increasing the chemical durability. However, these components do not contribute to increase in the Verdet constant. Therefore, if the content of them is too large, a sufficient Faraday effect is less likely to be achieved. Hence, the content of each of these component is preferably 0 to 10% and particularly preferably 0 to 5%.

$GeO_2$ is a component for increasing the glass formation ability. However, $GeO_2$ does not contribute to increase in the Verdet constant. Therefore, if its content is too large, a sufficient Faraday effect is less likely to be achieved. Hence, the content of $GeO_2$ is preferably 0 to 15%, more preferably 0 to 10%, and particularly preferably 0 to 9%.

$P_2O_5$ is a component for increasing the glass formation ability. However, an excessive large content thereof makes the glass material likely to be devitrified and tends to decrease the chemical durability. Furthermore, $P_2O_5$ does not contribute to increase in the Verdet constant. Therefore, if its content is too large, a sufficient Faraday effect is less likely to be achieved. Hence, the content of $P_2O_5$ is preferably 0 to 7% and particularly preferably 0 to 5%.

$Ga_2O_3$ has the effect of increasing the glass formation ability and widening the vitrification range. However, an excessive large content thereof makes the glass material likely to be devitrified. Furthermore, $Ga_2O_3$ does not contribute to increase in the Verdet constant. Therefore, if its content is too large, a sufficient Faraday effect is less likely to be achieved. Hence, the content of $Ga_2O_3$ is preferably 0 to 6% and particularly preferably 0 to 5%.

Fluorine has the effect of increasing the glass formation ability and widening the vitrification range. However, if its content is too large, fluorine volatilizes during melting, which may cause a composition variation or may have an influence on vitrification. Therefore, the content of fluorine (in terms of $F_2$) is preferably 0 to 10%, more preferably 0 to 7%, and particularly preferably 0 to 5%.

$Sb_2O_3$ may be added as a reductant. However, in order to avoid coloration or in consideration of environmental burden, its content is preferably 0.1% or less.

The glass material according to the present invention exhibits good light transmission properties within the range of wavelengths from 300 to 1100 nm. Specifically, the transmittance at a wavelength of 633 nm and an optical path length of 1 mm is preferably 60% or more, more preferably 65% or more, still more preferably 70% or more, yet still more preferably 75% or more, and particularly preferably 80% or more. Furthermore, the transmittance at a wavelength of 532 nm and an optical path length of 1 mm is preferably 30% or more, more preferably 50% or more, still more preferably 60% or more, yet still more preferably 70% or more, and particularly preferably 80% or more. Moreover, the transmittance at a wavelength of 1064 nm and an optical path length of 1 mm is preferably 60% or more, more preferably 70% or more, still more preferably 75% or more, and particularly preferably 80% or more.

Next, a description will be given of a method for manufacturing a glass material according to the present invention. The method for manufacturing a glass material according to the present invention is a method for manufacturing a glass material containing $Tb_2O_3$ and includes the steps of: melting a glass raw material and solidifying a resultant molten glass by cooling to obtain a precursor glass; and thermally treating the precursor glass in an inert atmosphere or a reducing atmosphere.

The precursor glass may be manufactured by a usual melting method using a melting container. However, as described previously, since this method has difficulty vitrifying the glass raw material particularly when the $Tb_2O_3$ content is large, the precursor glass is preferably produced by a containerless levitation technique. FIG. 1 is a schematic cross-sectional view showing an example of a manufacturing apparatus for producing a precursor glass by a containerless levitation technique. Hereinafter, a description will be given of a method for manufacturing a precursor glass with reference to FIG. 1.

An apparatus 1 for manufacturing a precursor glass includes a forming die 10. The forming die 10 also serves as a melting container. The forming die 10 includes a forming surface 10a and a plurality of gas jet holes 10b opening on the forming surface 10a. The gas jet holes 10b are connected to a gas supply mechanism 11, such as a compressed gas cylinder. Gas is supplied from this gas supply mechanism 11 via the gas jet holes 10b to the forming surface 10a. No particular limitation is placed on the type of the gas and inert gases, including nitrogen, argon, helium, and carbon dioxide; reducing gases, including carbon monoxide and hydrogen; and oxidized gases, including oxide and air, can be used singly or in a mixture of two or more of them. Among them, inert gases are preferably used in order to increase the percentage of $Tb^{3+}$ relative to the total content of Tb and from the viewpoint of safety.

In manufacturing a precursor glass using the manufacturing apparatus 1, first, a block 12 of glass raw material is placed on the forming surface 10a. Examples of the block 12 of glass raw material include a body obtained by forming raw material powders into a single piece by press forming or other processes, a sintered body obtained by forming raw material powders into a single piece by press forming or other processes and then sintering the single piece, and an aggregate of crystals having the same composition as a desired glass composition.

Next, gas is jetted out through the gas jet holes 10b, thus levitating the block 12 of glass raw material above the forming surface 10a. In other words, the block 12 of glass raw material is held out of contact with the forming surface 10a. In this state, the block 12 of glass raw material is irradiated with laser light from a laser light applicator 13. Alternatively, it is also possible that the block 12 of glass raw material is irradiated with laser light from the laser light applicator 13 while being in contact with the forming surface 10a and the block 12 of glass raw material is then levitated above the forming surface 10a in the process of dissolving or simultaneously with the completion of dissolving of the block 12 of glass raw material. In this manner, the block 12 of glass raw material is heated to melting and vitrified, thereby obtaining a molten glass. The flow rate of the gas can be appropriately set depending on, for example, the mass or volume of the block 12 of glass raw material or the shape, dimension or other features of the gas jet holes 10b, but, for example, is preferably set at 0.5 to 30 L/min., more preferably 5 to 25 L/min., and particularly preferably 10 to 20 L/min. If the flow rate of the gas is too low, the block 12 of glass raw material tends to be difficult to levitate. On the other hand, if the flow rate of the gas is too high, the levitated state of the block 12 of glass raw material becomes unstable, so that inconveniences are likely to occur, such as contact with the forming surface 10a and blow-off from the forming surface 10a. When an inert gas or a reducing gas is used, the block 12 of glass raw material becomes less likely to be oxidized or likely to be reduced as the gas flow rate increases. Therefore, the percentage of $Tb^{3+}$ relative to the total content of Tb can be increased. The method for heating the block of glass raw material to melting may be radiation heating besides the method of irradiating it with laser light.

Thereafter, the molten glass is cooled, so that a precursor glass can be obtained. During the step of heating the block 12 of glass raw material to melting and the step of cooling the molten glass and in turn the precursor glass at least to below the softening point, at least the jetting of gas is preferably continued to restrain the contact of the block 12 of glass raw material, the molten glass, and finally the precursor glass with the forming surface 10a.

Subsequently, the obtained precursor glass is thermally treated in an inert atmosphere or a reducing atmosphere. Examples of the inert gas to be used include nitrogen, argon, helium, and carbon dioxide and examples of the reducing gas to be used include carbon monoxide and hydrogen. In consideration of safety, the reducing atmosphere is preferably an atmosphere in which a mixture gas of a reducing gas and an inert gas is used. A reducing atmosphere is preferred from the viewpoint of effectively increasing the percentage of $Tb^{3+}$ relative to the total content of Tb and an atmosphere of a mixture gas of hydrogen and an inert gas is particularly preferred from the viewpoint of safety.

The thermal treatment temperature is preferably not less than (the glass transition point of the precursor glass −50° C.) and particularly preferably not less than (the glass transition point −30° C.). If the thermal treatment temperature is too low, the effect of increasing the percentage of $Tb^{3+}$ relative to the total content of Tb is less likely to be achieved. On the other hand, if the thermal treatment temperature is too high, devitrification is likely to occur. Therefore, the thermal treatment temperature is preferably not more than (the glass transition point +100° C.), more preferably not more than (the glass transition point +80° C.), still more preferably not more than (the glass transition point +50° C.), and particularly preferably not more than (the glass transition point +30° C.)

The thermal treatment time is preferably not less than 0.5 hours and particularly preferably not less than an hour. If the thermal treatment time is too short, the effect of increasing the percentage of $Tb^{3+}$ relative to the total content of Tb is less likely to be achieved. On the other hand, the upper limit of the thermal treatment time is not particularly placed, but an excessively long thermal treat time does not provide an enhanced effect and leads to energy loss. Therefore, the thermal treatment time is preferably not more than 100 hours, more preferably not more than 50 hours, and particularly preferably not more than 10 hours.

EXAMPLES

The present invention will be described below with reference to examples but the present invention is not at all limited by the following examples.

Table 1 shows examples of the present invention and a comparative example.

described in the table was read from the obtained light transmittance curve. The light transmittance is the external light transmittance including reflection.

The percentage of $Tb^{3+}$ relative to the total content of Tb was measured using an X-ray photoelectron spectroscopic analyzer (XPS). Specifically, as for the obtained glass material, the percentage of $Tb^{3+}$ relative to the total content of Tb was calculated from the peak intensity ratio of each Tb ion measured using the X-ray photoelectron spectroscopic analyzer.

The Verdet constant was measured using a rotating analyzer technique. Specifically, the obtained glass material was polished to have a thickness of 1 mm, the polished glass material was measured in terms of angle of Faraday rotation at wavelengths of 400 to 1100 nm in a magnetic field of 15 kOe, and the Verdet constants were calculated. The wavelength sweep speed was 6 nm/min.

TABLE 1

| | | Examples | | | | | | Comparative Example |
|---|---|---|---|---|---|---|---|---|
| | | No. 1 | No. 2 | No. 3 | No. 4 | No. 5 | No. 6 | No. 7 |
| Glass | $Tb_2O_3$ | 41 | 50 | 50 | 60 | 60 | 41 | 41 |
| Composition | $Al_2O_3$ | 20 | 10 | 10 | | | 20 | 20 |
| (% by mole) | $SiO_2$ | 10 | 10 | 10 | 5 | 5 | 10 | 10 |
| | $B_2O_3$ | 29 | 30 | 30 | 35 | 35 | 29 | 29 |
| Gas for | Type | $N_2$ | $N_2$ | $N_2$ | $N_2$ | $N_2$ | $O_2$ | $O_2$ |
| Levitation | Flow Rate (L/min) | 12 | 12 | 16 | 16 | 16 | 12 | 16 |
| Glass Transition Point (° C.) | | 760 | 780 | 780 | 800 | 800 | 760 | 760 |
| Thermal Treatment Atmosphere | | $N_2$ | $N_2$ | $N_2$ | $N_2$ | $H_2/N_2$ | $H_2/N_2$ | Air |
| Thermal Treatment Temperature (° C.) | | 760 | 780 | 780 | 800 | 800 | 760 | 760 |
| Percentage of $Tb^{3+}$ (% by mole) | | 89 | 75 | 82 | 65 | 96 | 85 | 54 |
| Light | 532 nm | 76.3 | 51.4 | 68.3 | 37.3 | 81 | 76.1 | 7.2 |
| Transmittance | 633 nm | 80.3 | 75.2 | 80.1 | 68.8 | 82.3 | 80.2 | 42.5 |
| (%) | 1064 nm | 82.7 | 82.2 | 82.1 | 82.8 | 83.7 | 82.5 | 79.8 |
| Verdet | 532 nm | −0.88 | −1.05 | −1.06 | −1.22 | −1.26 | −0.88 | −0.88 |
| Constant | 633 nm | −0.57 | −0.69 | −0.69 | −0.80 | −0.82 | −0.57 | −0.57 |
| (min/Oe · cm) | 1064 nm | −0.16 | −0.20 | −0.20 | −0.23 | −0.24 | −0.16 | −0.15 |

First, raw materials formulated to have each of glass compositions indicated in Table 1 were press-formed and sintered at 1000 to 1400° C. for 6 hours, thus producing a block of glass raw material. Next, the block of glass raw material was coarsely ground into 0.05 to 0.5 g small pieces. Using the obtained small piece of the block of glass raw material, a precursor glass (with a diameter of approximately 1 to 8 mm) was produced by a containerless levitation technique using an apparatus conforming to FIG. 1. Note that the type and flow rate of gas for levitating each block of glass raw material are as described in Table 1 and a 100 W $CO_2$ laser oscillator was used as a heat source.

The obtained precursor glass was thermally treated for three hours in the atmosphere described in Table 1 and at the temperature described in Table 1, thus obtaining a glass material. In the table, "$H_2/N_2$" refers to an atmosphere of a mixture gas of 4% $H_2$ and 96% $N_2$ in % by volume.

The obtained glass material was measured in terms of the percentage of $Tb^{3+}$ relative to the total content of Tb, the light transmittance, and the Verdet constant in the following manners.

The light transmittance was measured using a spectrophotometer (UV-3100 manufactured by Shimadzu Corporation). Specifically, the obtained glass material was polished to have a thickness of 1 mm, a light transmittance curve was obtained by measuring the light transmittances of the polished glass material at wavelengths between 300 nm and 1400 nm, the light transmittance at each wavelength As is obvious from Table 1, the glass materials Nos. 1 to 6, which are examples of the present invention, exhibited high percentages of $Tb^{3+}$ of 65% or more relative to the total content of Tb and were therefore excellent in light transmittance at each wavelength. Furthermore, these glass materials also exhibited good Verdet constants at each wavelength. On the other hand, the glass material No. 7, which is a comparative example, exhibited a low percentage of $Tb^{3+}$ of 54% relative to the total content of Tb and was therefore poor in light transmittance at each wavelength as compared to the glass materials in the examples of the present invention.

REFERENCE SIGNS LIST

1: apparatus for manufacturing a precursor glass
10: forming die
10a: forming surface
10b: gas jet hole
11: gas supply mechanism
12: block of glass raw material
13: laser light applicator

The invention claimed is:
1. A method for manufacturing a glass material containing $Tb_2O_3$, the method comprising the steps of:
melting a glass raw material and solidifying a resultant molten glass by cooling to obtain a precursor glass; and thermally treating the precursor glass in an inert atmosphere or a reducing atmosphere; wherein
the glass material contains, in terms of % by mole of oxide, more than 40% $Tb_2O_3$.

2. The method for manufacturing a glass material according to claim 1, wherein the precursor glass is thermally treated at a temperature of (a glass transition point −50° C.) to (the glass transition point +100° C.).

3. The method for manufacturing a glass material according to claim 1, wherein the molten glass is obtained by heating a block of glass raw material to melting with the block of glass raw material held levitated above a forming surface of a forming die by jetting gas through a gas jet hole opening on the forming surface.

4. The method for manufacturing a glass material according to claim 3, wherein the block of glass raw material is levitated by an inert gas.

* * * * *